(12) United States Patent
Zhebelev

(10) Patent No.: US 11,136,240 B2
(45) Date of Patent: Oct. 5, 2021

(54) PROCESS FOR PRODUCING GRAPHENE

(71) Applicant: Tatyana Sergeevna Zhebeleva, Moscow (RU)

(72) Inventor: Sergei Ivanovich Zhebelev, Kaliningrad (RU)

( * ) Notice: Subject to any disclaimer, the term of this patent is extended or adjusted under 35 U.S.C. 154(b) by 348 days.

(21) Appl. No.: 16/345,737

(22) PCT Filed: May 12, 2017

(86) PCT No.: PCT/RU2017/000304
§ 371 (c)(1),
(2) Date: Aug. 13, 2019

(87) PCT Pub. No.: WO2018/084739
PCT Pub. Date: May 11, 2018

(65) Prior Publication Data
US 2020/0223697 A1  Jul. 16, 2020

(30) Foreign Application Priority Data

Nov. 7, 2016 (RU) .......................... RU2016143665

(51) Int. Cl.
*C01B 32/184* (2017.01)
*B82B 3/00* (2006.01)
*B82Y 40/00* (2011.01)

(52) U.S. Cl.
CPC .......... *C01B 32/184* (2017.08); *B82B 3/0038* (2013.01); *B82Y 40/00* (2013.01); *C01B 2204/22* (2013.01)

(58) Field of Classification Search
CPC .............. C01B 32/184; C01B 2204/22; C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/225; C01B 32/23; C01B 32/182; C01B 32/198; C01B 2204/04; C01B 2204/06; C01B 2204/065; C01B 2204/00; C01B 2204/02; C01B 2204/20; B82B 3/0038; B82B 3/0019; B82Y 40/00

See application file for complete search history.

(56) References Cited

U.S. PATENT DOCUMENTS

2013/0102084 A1   4/2013  Loh et al.

FOREIGN PATENT DOCUMENTS

| RU | 2570069 C1 | 12/2015 | |
| WO | 2011055039 A1 | 5/2011 | |
| WO | WO 2011/055039 | * 5/2011 | ............. B82Y 30/00 |

OTHER PUBLICATIONS

Zheltov, et al., The passage of an electrical current through a fluidized bed of electrically conducting particles, Journal of Engineering Physics 1970; 18: 47-50 (Year: 1970).*

Zhebelev, Electrodynamic fluidization of microparticles with a finite electrical conductivity, Journal of Engineering Physics 1991; 60: 576-580 (Year: 1991).*

Francesco Bonaccorso, Antonio Lombardo, Tawfique Hasan, Zhipei Sun, Luigi Colombo, Andrea C.Ferrari "Production and processing of graphene and 2d crystals", Materialstoday (Elsevier Ltd, UK), date 2012, vol. issue No. 12, pp. 564-589,(pii-S1369702113700142) 1.1. Dry exfoliation, 1.1.2. Anodic bonding.

Francesco Bonaccorso, Antonio Lombardo, Tawfique Hasan, Zhipei Sun, Luigi Colombo, Andrea C.Ferrari "Production and processing of graphene and 2d crystals", Materialstoday (Elsevier Ltd, UK), date 2012, vol. issue No. 12, pp. 564-589,(pii-S1369702113700142) 1.1 Dry exfoliation, 1.1.2. Anodic bonding, (https://www.sciencedirect.com/science/article/pi/S1369702113700142 ).

* cited by examiner

*Primary Examiner* — Daniel C. McCracken

(57) ABSTRACT

The invention relates to the production of carbon nanomaterials, for example graphene, and can be used to produce graphene for use in nanoelectronics.

Graphene is produced by stratifying graphite particles, differing in that graphite particles undergo electrodynamic fluidization in a vacuum in which the energy of the graphite particles exceeds the work necessary for their cleavage along the cleavage planes on graphene layers during brittle fracture when striking against the electrodes.

The method makes it possible to obtain graphene with high productivity, economy and purity of the product.

1 Claim, No Drawings

PROCESS FOR PRODUCING GRAPHENE

The invention relates to the production of carbon nanomaterials, for example graphene, and can be used to produce graphene for use in nanoelectronics.

All currently known methods for the production of graphene are long and costly with small yield of graphene. (Eletskii A V, Iskandarova I M, Knizhnik A A, Krasikov D N "Graphene: fabrication methods and thermophysical properties" Phys. Usp. 54 233-250 (2011); DOI: 10.3367/UFNe.0181.201103a.0233).

A methods of forming graphene by graphite exfoliation is known (see U.S. Pat. No. 20130102084 A1, IPC C01B 31/04, H01L 51/00, H01L 51/42, published on: 25 Apr. 2013), which combines a number of variants involving insertion into the space between atomic layers graphite sample of solutions of metal salts (Li, Al, Fe, Cu) in organic solvents (propylene carbonate, N, N-dimethylformamide, dimethylsulfoxide). Ions and organic molecules of the solvent expand the space between the atomic layers, which provides the possibility of their separation under the influence of an external driving force, which can have an electrochemical, thermal, microwave, solvotermal, acoustochemical or acoustic nature.

Disadvantage of the method is low productivity due to the long duration of the stages of its implementation.

The closest to the claimed technical solution is the process for producing graphene particles or flakes by rubbing solid graphite over a rough surface, for example a glass surface having a roughness of 0.01 to 10 pm. During friction, graphite is transferred to a rough surface, leaving traces which are graphene material. This surface is then subjected to sonication to separate the graphene material from it (WO 2011055039, cl. B82Y 30/00, 2011).

The disadvantage of the method lies in its low productivity, because the method requires a continuous interruption of the process for separating the graphene layers from the abrasion surface to restore the roughness and continuing the hard graphite abrasion process.

The task, to solve which the claimed invention is directed, is increase productivity and efficiency of the process for making carbon nanomaterials, in particular of graphene.

This problem is solved due to the fact that the claimed method for producing graphene by graphite stratification is characterized in that graphite particles undergo electrodynamic fluidization in a vacuum, in which the energy of the graphite particles exceeds the work required for their breaking at the impacts of the particles on the electrodes.

The technical result, provided by the above set of features, is an increase in the productivity and efficiency of the process of producing graphene.

The essence of the invention is as follows.

In the proposed method for producing a graphene process is performed in the mode electrodynamic fluidization of graphite particles in a vacuum. Where create conditions, under which the energy of the graphite particles exceeds necessary work for their separation into layers in brittle fracture along the cleavage planes, which occurs due to impacts of particles on electrodes.

The method is carried out as follows. As a source for graphene is used a graphite powder, whose particles are placed in an electric field between two electrodes in a vacuum, a potential difference sufficient to fluidize the particles (moving particles between electrodes with their recharge at the electrodes), when $qU/d > mg$ where $q$ is the charge of the particle, $U$—the difference of the electrode potentials, $d$—the interelectrode distance, $m$—mass of the particle, $g$—acceleration due to gravity. At each overflight interelectrode gap without resistance in vacuum medium particle acquires energy $qU$. In this case, the particles experience point impacts on the electrodes, which leads to their brittle fracture along the cleavage planes perfect for graphite, that is, along the boundaries of the layers of graphene.

A prerequisite for this process is the sufficiency of the energy accumulated by the particle before impact on the electrode $qU$, to carry out work on splitting the particle $E_{split}$. To fulfill this condition adjust the value of $U$—the difference of the electrode potentials. Sequential splitting of the particles and their parts causes that the end product of the process are single sheets of graphene. The condition of carrying out the process in a vacuum provides sufficient energy for the particles to split and the purity of the product. It should also be noted that graphene in its free state is not rigid and folds into a ball. However, in an electric field, a sheet of graphene, having a charge, unfolds and is suitable for further processing (moving, separating by size and other operations) in the same vacuum space. In an inhomogeneous electric field, for example, with non-parallel electrodes, the particles also move toward a lower field strength. Therefore, to increase productivity, the source material is loaded in a narrow part of the interelectrode space and the product is discharged in its wider part.

The method allows to obtain graphene with high productivity, economy and product purity.

The possibility of carrying out the claimed invention is shown by the following example.

EXAMPLE

According (CRC Handbook of chemistry and physics. 86 h edition. 2005-2006.) graphite consists of two-dimensional layers of graphene. Spacing between layers 0.3354 nm with a binding energy in the layer of graphene 7.8 eV/atom, and considerably weaker bonds between 0.056 eV/atom layers, determined by Van der Waals forces. The values of the binding energy between layers obtained experimentally lie in the range from 0.043 to 0.061 eV/atom (Zacharia R., Ulbricht H., Hertel T. Interlayer cohesive energy of graphite from thermal desorption of polyaromatic hedrocarbons// Phys.Rev. 2004 V.B69, P.155406.). A two-dimensional lattice of graphene consists regular hexagons with sides $dl=0.1418$ nm and an area of $(3)^{3/2} \times dl^2 = 5,35 \times 10^{-20}$ m$^2$ by two carbon atoms per cell. Then the specific binding energy of the layers per unit area of the particle split surface is $$e_{split} = 2 \cdot (0.056 \text{ eV/atom} \cdot 1{,}602 \cdot 10^{-18} \text{ J/eV})/5{,}35 \times 10^{-20} \text{m}^2 = 0.335 \text{ J/m}^2$$

The energy required to split a particle with an area of split $S_{split}$ into two parts is equal to $E_{split} = 2 S_{split} e_{split}$, J.

The process of electrodynamic fluidization consists in vibrational motion of conducting particles between electrodes when they are recharged on electrodes. When finding on the electrode particles acquire a charge $q$, which depends on the intensity of $U/d$ field, the charge is proportional to the surface area of the particle, in vacuum (not experiencing resistance of environment), moving under the force $qU/d$, where $U$ is the difference of the electrode potentials, $d$—the interelectrode distance, the particle acquires energy $qU$.

The electrical conductivity of graphite over layers is close to metallic, while at the same time the electrical conductivity across the layers is hundreds of times smaller (Eletskii A V, Iskandarova I M, Knizhnik A A, Krasikov D N "Graphene:

fabrication methods and thermophysical properties" Phys. Usp. 54 233-250 (2011); DOI:10.3367/UFNe.0181.201103a.0233).

Therefore, a charged graphite particle is a stack of dipoles (graphene layers) oriented along the field. Upon impact, the particle undergoes a shear stress, parallel to the layers of graphite.

With sufficient energy, this leads to a split of the particle. Since the particle charge q is proportional to surface area of the particle, and the work on splitting the particle proportional to the area of its section, the ratio $qU/E_{split}$ does not depend on the particle size and regulated by value U. To implement splitting of particle is necessary that the ratio of energy of the particle before to impacts on electrodes to split energy (energy reserve) was greater than unity: $qU/E_{split} > 1$. For spherical particles $q = \frac{2}{3}\pi^3 r^2 \varepsilon_0 \, U/d$, where r—radius of the particle, $\varepsilon_0 = 8.85 \cdot 10^{-12}$ F/m—the permittivity.

In the case of a split in the maximum cross section, that is, half, $S_{split} = \pi \, r^2$ and the energy reserve equals $$qU/E_{split} = (\tfrac{2}{3}\pi^3 r^2 \varepsilon_0 U^2/d)/(2\pi r^2 e_{split}) = (\tfrac{1}{3}\pi^2)(\varepsilon_0 U^2/d)/e_{split}$$

It is important to emphasize that this ratio does not depend on the particle size, but depends only on their shape (the first factor). For the usual conditions of electrodynamic fluidization $d = 1 \cdot 10^{-2}$ m and $U = 3 \cdot 10^4$ V the energy reserve for spherical particles is 7.74. For asymmetric particles such as a hemisphere, and the charge $q = 3\pi \, r^2 \, \varepsilon_0 \, U/d$ the energy reserve is 3.6.

For thin particles lying on the electrode, in which the thickness is much smaller than the other dimensions, the charge density is equal to the electrode charge density $\Sigma_0 \, U/d$, and the charge is determined by the area of the exposed surface S, $q = S\varepsilon_0 \, U/d$. For thin disks $q = \pi r^2 \varepsilon_0 \, U/d$. Accordingly, the energy reserve is 1.19. Since for fine particles the value of the surface is close in the size of the cleavage area, this value will be the same for thin particles of a different shape. Since the particle charge q is proportional to the surface area of the particle, and the work on the particle splitting is proportional to the area of its cross section, the ratio $qU/E_t$ does not depend on the particle size and is regulated by the value of U.

Since for fine particles the value of the surface is close in the size of the cleavage area, this value will be the same for thin particles of a different shape.

When the thickness of the particles decreases as a result of the split, less than a certain limit, upon impact, the particles begin to lose longitudinal stability, which leads to bending stresses This further contributes to the stratification of particles. Conditions electrodynamic fluidization $qU/d \gg mg$ performed for particles smaller than 1 mm under the graphite density of $2.3 \times 10^3$ kg/m$^3$. Thus all particles of any size and shape smaller than 1 mm for the accepted conditions $d = 10^{-2}$ m and $U = 3 \cdot 10^4$ V there is enough energy to split.

Therefore, the process goes on until the end, that is, before the particles split into single layers. It should be noted that the splitting of particles across the layers requires two orders of magnitude more energy. When taking into account the conservation of part of the energy when a particle bounces off electrodes, the maximum energy of a particle is $qU/(1-k^2)$, where k—the coefficient of conservation of momentum on impact. To improve the economics of the process, it is advisable to use hard electrodes, for which a large momentum conservation factor is observed upon impact. Thus, the proposed method allows to increase efficiency and productivity of obtaining graphene from graphite.

The invention claimed is:

1. A method for producing graphene by graphite stratification, characterized in that the graphite particles are subjected to electrodynamic fluidization in a vacuum in which the energy of the graphite particles exceeds the work necessary to split them upon impact of particles on the electrodes.

* * * * *